June 14, 1955    A. Y. DODGE    2,710,504
TOROIDAL CHAMBER TYPE HYDRAULIC TORQUE CONVERTER
Filed June 6, 1952    3 Sheets-Sheet 1

Inventor:
Adiel Y. Dodge,
By Dawson, Orms, Britton & Spangenberg,
Attorneys.

June 14, 1955 A. Y. DODGE 2,710,504
TOROIDAL CHAMBER TYPE HYDRAULIC TORQUE CONVERTER
Filed June 6, 1952 3 Sheets-Sheet 3
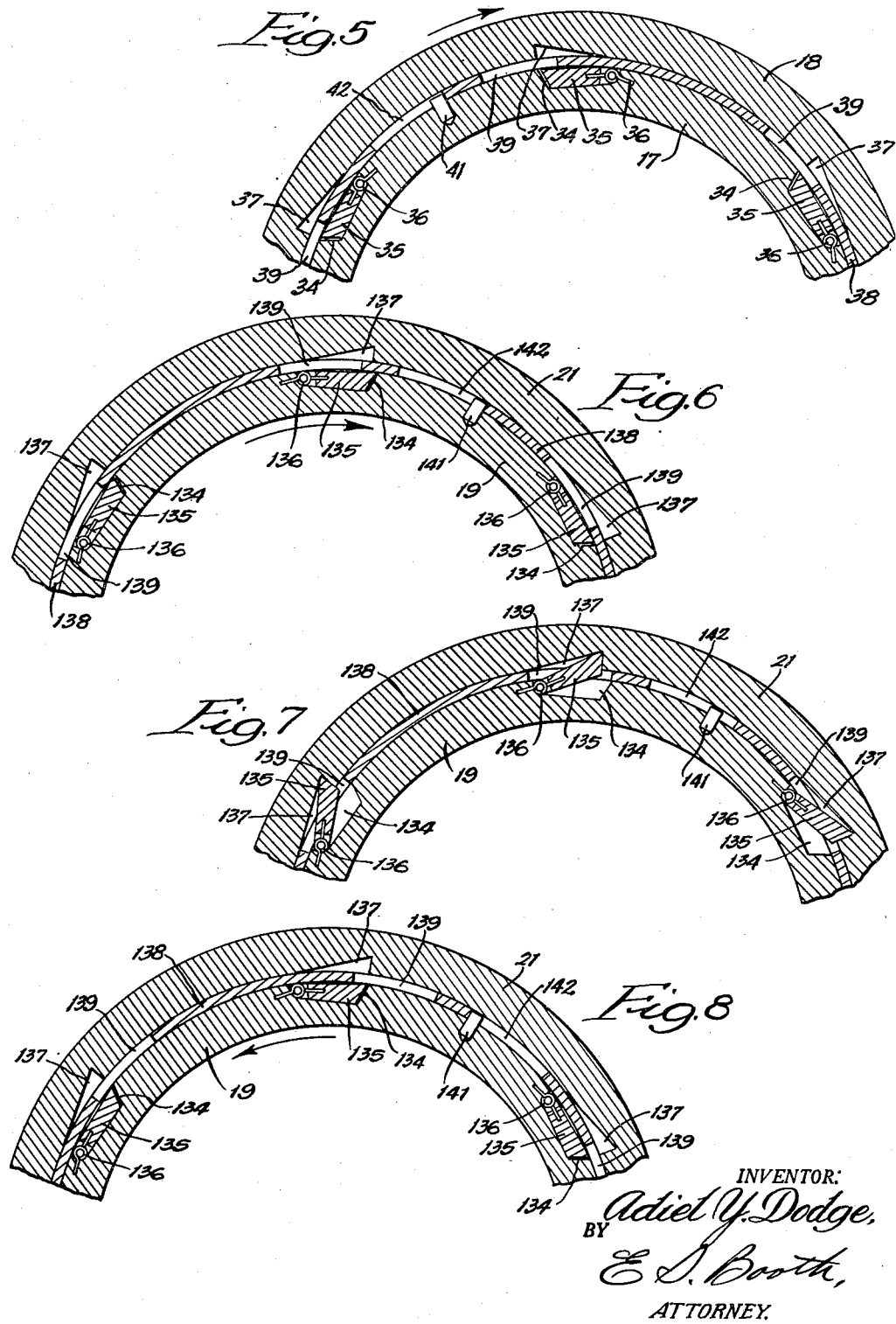

United States Patent Office 2,710,504
Patented June 14, 1955

2,710,504

TOROIDAL CHAMBER TYPE HYDRAULIC TORQUE CONVERTER

Adiel Y. Dodge, Rockford, Ill.

Application June 6, 1952, Serial No. 292,100

4 Claims. (Cl. 60—54)

This invention relates to hydraulic torque transmitting devices and more particularly to hydraulic torque converters having auxiliary rotor or stator rings and to a ratchet control therefor.

It has been proposed heretofore to provide auxiliary rings rotatable relative to the main portions of the vaned elements in torque converters, such rings usually being held against relative rotation with respect to the main vaned elements by one-way clutches. When a one-way clutch is employed, the ring may be stopped in substantially any position relative to the main member so that the vanes on the ring and the main member may or may not be in alignment. Obviously for smooth fluid flow it is necessary that the vane sections be aligned in registry with each other. Therefore, with prior types of devices the performace under different conditions is not uniform due to the fact that at one time the vanes may be very nearly in alignment and may be out of alignment at another time.

It is, furthermore, highly important to exercise proper control over the auxiliary vaned sections to insure that they will be connected to the main vaned sections under certain desired conditions only and only at times when shock will be minimized.

It is accordingly one of the objects of the present invention to provide a fluid torque transmitting device having auxiliary vane sections which are coupled to the main sections in predetermined positions only such that the vanes will be in register. In the preferred construction, a positive ratchet type device is employed having its ratchet teeth or notches and its pawls so located that they can only engage when the vanes are in register.

Another object is to provide a fluid torque transmitting device having an auxiliary vane member in which the connection of the auxiliary member to the main member can only occur under predetermined operating conditions. For example, when an auxiliary member is utilized at the discharge of the driving member, it is ordinarily desirable to connect it to the main driving member only at relatively high speed and when the speeds of the members are approximately equal, and the connecting device may be so arranged that it will be ineffective at low speeds. On the other hand, when the stator is provided with an auxiliary stator ring, the connecting member is so constructed that it will function only at very low speeds and will freely overrun the stator ring at higher speeds.

The above and other objects and advantages of the invention will be more readily apparent when read in connection with the accompanying drawings, in which—

Figure 5 is a view similar to Figure 4 showing another type of ratchet device;

Figure 6 is a view similar to Figure 5 showing still another of the ratchet devices, and Figures 7 and 8 are views similar to Figure 6 showing the parts in different positions.

Figure 1:
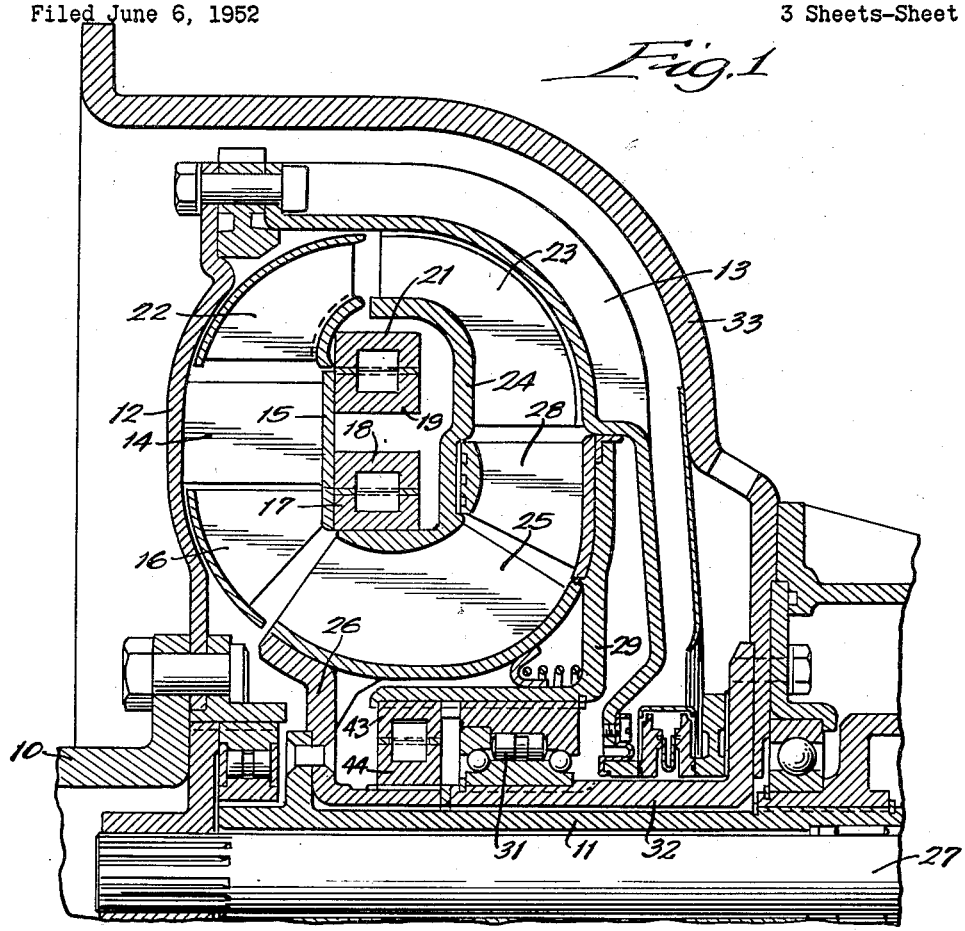
Figure 1 is a partial axial section through a hydraulic torque converter embodying the invention.

The torque converter shown in Figure 1 is adapted to connect a driving shaft 10 to a tubular driven shaft 11. The driving shaft has a flange 12 secured thereto which is connected at its periphery to a housing 13. The flange 12 carries a fixed set of impeller vanes 14 which are secured to the flange and to a center ring 15 for rotation with the flange under all operating conditions. Adjacent the inlet ends of the vanes 14 there is mounted an auxiliary ring carrying a set of vanes 16 connected to a ratchet ring 17. The main impeller vanes 14 carry a pair of ratchet rings 18 and 19, the ring 18 cooperating with the ring 17 in a manner to be described more fully hereinafter.

The ratchet ring 19 cooperates a ratchet ring 21 which is connected to an auxiliary set of outlet vanes 22 at the outer discharge end of the vanes 14.

Fluid from the impeller enters a set of rotor vanes 23 carried by a core 24 which is in turn connected to a spaced set of rotor vanes 25. The rotor vanes 25 are rigidly connected through a flange 26 to the driven shaft 11. The driven shaft 11 and an extension 27 of the driving shaft may be connected respectively to two different elements of a planetary gear set to form a two path drive as more fully described and claimed in my Patent No. 2,242,515.

Beween the rotor vanes 23 and 25 there is mounted a set of stator vanes 28 carried by a hub member 29. The stator vanes are held against rotation by a one-way brake 31 engaging the hub member 29 and a sleeve 32 secured to a fixed housing 33 for the torque converter. Thus the stator vanes are normally held against reverse rotation but are free to turn forward.

During negative torque conditions as in descending a hill both rings 16 and 22 are disconnected from the main impeller section 14 to rotate forward freely and will not interfere with flow of fluid in the circuit. At low speed or during high torque requirements, the ring 16 is connected to main section 14 by the ratchet 17, 18 but the vanes 22 remain disconnected and may rotate freely to accommodate the natural flow of fluid. Thus the impeller is of a relatively small effective diameter during low speed and high torque conditions. At higher speed and lower torque the vanes 22 are connected to the main impeller section through the ratchet device 19–21 to increase the effective diameter of the impeller for greater efficiency under these conditions.

As shown in Figure 5, the inner ring 17 is formed with a series of notches or recesses 34 to receive pivoted pawls 35 which are urged outwardly by springs 36. The construction of the pawls and springs is like that more particularly described and claimed in my Patent No. 2,340,368. When the pawls are in their inner positions, as shown, they lie wholly within the recesses 34 and are adapted to move out into notches 37 formed on the inner surface of the outer ring 18. The springs 36 urge the pawls outward, aided by centrifugal force into engagement with the notches 37 to establish a driving connection between the ratchet rings.

In order to hold the pawls inward positively to prevent any clicking, a blocking ring 38 is provided lying between the inner and outer ratchet rings and having openings 39 therein through which the pawls may project. The blocking ring engages the outer ratchet ring with a relatively light friction so that it tends to move with it and is limited in its movement relative to the inner ratchet ring by a pin 41 carried by the inner ratchet ring and fitting into an elongated slot 42 in the blocking ring.

When the inner ring 17 turns clockwise relative to the outer ring 18, the notches 37, due to their shape, will cam the pawls inward and the blocking ring will be moved to the position shown in which it partially overlies the pawls to prevent them from moving outward. At this time the pawls will be held disengaged so that the inner ring can move clockwise freely relative to the outer ring. Upon a reversal of the relative direction of the inner and outer rings, the blocking ring will be turned clockwise relative to ring 17 to bring the openings 39 into register with the pawls so that the pawls can move outward into the notches 37 to connect the rings.

In operation of the torque converter, the outer ring 18 normally turns clockwise as seen in Figure 5. During normal operating conditions fluid will strike the faces of vanes 16, tending to turn them backwards or counterclockwise as seen in Figure 5 relative to the main vanes 14. Under these conditions the pawls will move out into the notches 37 to connect vanes 14 and 16 for rotation together. During negative torque loads as in coasting down hill the vanes 16 tend to overrun the vanes 14. At this time the pawls 35 will be cammed inward and the ring 38 will be turned to the position shown in Figure 5 to hold them in. Thus the vanes 16 can freely overrun vanes 14 without clicking to reduce drag on the vehicle and to result in a saving of fuel.

According to one of the important features of the invention, the angular spacing of the notches 37 and the pawls 35 is such that when they are in engagement the vanes or at least a majority of the vanes on the rings 14 and 16 are in registry. For this purpose the vanes 14 and 16 are so spaced and are so related numerically that a majority thereof will register in smooth alignment. It will be apparent that this condition will be true when both rings have the same number of uniformly spaced vanes or when the vanes on one ring are an integral multiple of the number of vanes on the other ring. Where it is not desired to have the same vane numbers and spacing on both rings or where uneven spacing of the vanes is employed to avoid harmonics, the spacing is so selected that a majority of the vanes will be in register. Thus with this construction when the auxiliary ring is connected to the main rotor ring through the ratchet device, the vanes will present a substantially continuous smooth surface to the liquid.

The outer vanes 22 are connected to the main vanes 14 by the ratchet device 19-21 as shown in Figures 6, 7 and 8. In this device the inner ring 19 is formed with a series of notches or recesses 134 to receive pivoted pawls 135 which are urged inwardly by springs 136. The outer ring 21 is formed with notches 137 to receive the pawls thereby to connect the rings and the vanes for rotation together.

To prevent connection of the rings 19 and 21 when not desired a blocker ring 138 is mounted between the rings and is formed with openings 139 through which the pawls can pass into the notches 137. The blocker ring 138 frictionally engages the outer ring 21 and its rotation relative to the inner ring 19 is limited by a pin 141 on the inner ring fitting into an elongated slot 142 in the blocker ring. The slot 142 is so positioned and of such length that the blocker ring can move between two blocking positions shown in Figures 6 and 8 in both of which the blocker ring overlies the pawls to prevent engagement thereof with the notches 137.

At low speeds the springs 136 will hold the pawls 135 in and fluid will strike the fronts of vanes 22 to turn them and ring 21 backwards; i. e., counterclockwise, relative to vanes 14 and ring 19. At this time the pawls will be held in regardless of speed. To cause engagement of the ratchet without shock the engine may be slowed down momentarily, causing the vanes 22 to overrun the main vanes 14. When this occurs the blocker ring will turn to the position of Figure 7 so that the pawls can move out through the openings 139 in response to centrifugal force and when the engine again starts to drive the vanes 14 and 22 will be connected. Even if excessive overrunning should turn the blocker ring to the position of Figure 8 the pawls will move out as soon as the main vanes 14 again start to drive and will themselves prevent the blocker ring from turning back to the position of Figure 6 by engagement with the ends of openings 139. Thus engagement of the ratchet mechanism above a predetermined speed and under the desired operating conditions is insured. During negative torque conditions as in descending a grade the vanes 22 will overrun the vanes 14 to turn the blocker ring to the position of Figure 8, thereby to permit free overrunning with no clicking. In this construction also the notches and pawls are so located that when they are in engagement the vanes 14 and 22 are in registry.

With the torque converter shown in Figure 1 it is desirable to couple the stator vanes 28 to the driven rotor under conditions approaching one to one drive. For this purpose the hub 29 is connected to an outer ratchet ring 43, and an inner ratchet ring 44 is connected to the driven shaft 11. The ratchet rings 43 and 44 form parts of a ratchet device which may be constructed in the same manner as the ratchet device 17—18, as shown in Figure 5. At low impeller speeds and high torque multiplication, fluid strikes the fronts of the stator vanes and tends to drive them backward, motion being resisted by the one-way brake 31. As the ratio approaches unity, the fluid will strike the backs of the stator vanes and drive the stator forward, overrunning the one-way brake. When the stator is stationary, the ratchet device 43—44 is ineffective and the rotor can turn forward relative to the stator. However, when the stator starts turning forward, it will move the blocking ring to its ineffective position allowing the pawls to move out to connect the stator and the rotor. In this case again the pawls and notches are so located that when they are engaged the stator vanes 28 will register with the rotor vanes 23 and 25 to form a substantially smooth continuous vane from the rotor inlet to the rotor outlet.

Figure 2:
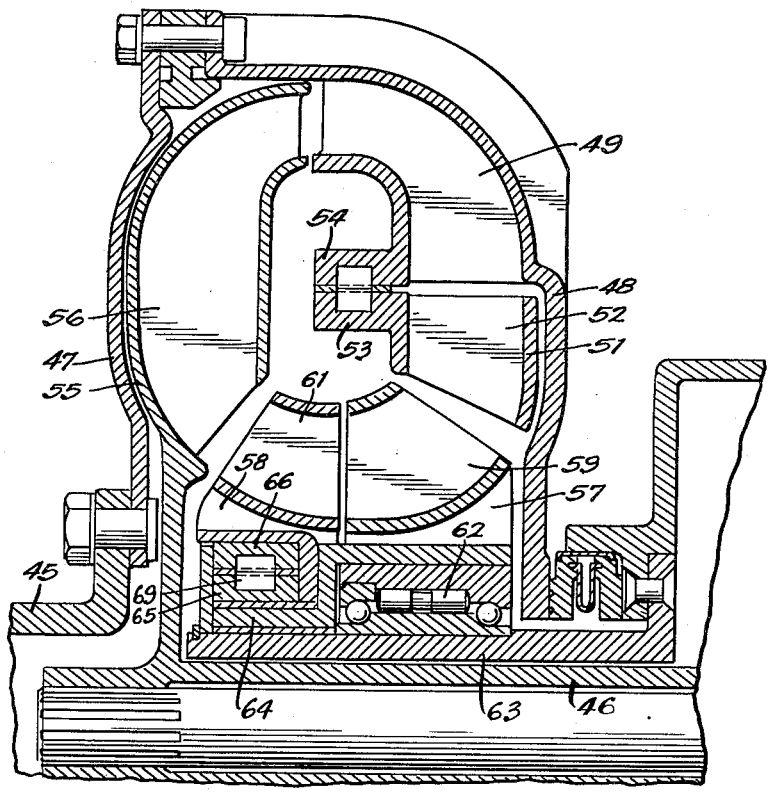
Figure 2 is a view similar to Figure 1 of an alternative construction.

Figure 2 illustrates an alternative construction for connecting a driving shaft 45 to a tubular driven shaft 46. The driving shaft 45 has a flange 47 connected thereto which is in turn connected to an impeller housing 48. A set of main impeller vanes 49 are fixedly secured in the housing 48, as shown.

At the inlet ends of the impeller vanes 49 there is arranged an auxiliary impeller ring 51 carrying a set of inlet vanes 52. The ring 51 is connected to an inner ratchet ring 53 cooperating with an outer ratchet ring 54 connected to the main impeller vanes 49. The ratchet device 53—54 may be constructed the same as the device 17—18.

Since vanes 52 receive liquid from a stator the fluid will strike their backs and cause them to overrun the vanes 49 at slow speed and high torque multiplication and during coasting. The ratchet device 53—54 is set to permit this. As soon as fluid starts striking the faces of vanes 52 and tends to turn them backward the ratchet device will engage to connect these vanes to the main impeller vanes 49. It will be noted that the speeds of these vanes will always be very close to synchronism at this time.

The impeller vanes cooperate with a rotor 55 connected to the driven shaft 46 and carrying a set of vanes 56 which register at their inlet ends with the outlet ends of the impeller vanes.

Between the outlet end of the rotor and the impeller inlet a stator is provided formed with two stator rings 57 and 58. The ring 57 carries a set of vanes 59, and the ring 58 carries a set of vanes 61. Preferably, the vanes 59 and 61 are equal in number and spacing although they may be oppositely curved for effective operation.

The stator ring 57 is held against reverse rotation by a one-way brake 62 acting between the stator ring and a fixed sleeve 63. The hub of the ring 57 is formed with an offset extension 64 to which is connected an inner ratchet ring 65. The ratchet ring 65 cooperates with an outer ratchet ring 66 which is carried by the stator ring 58.

Figure 3:
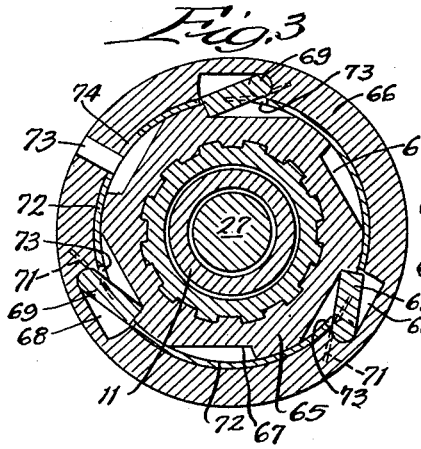
Figure 3 is a sectional view through a ratchet device showing the ratchet in engaged position.
Figure 4:
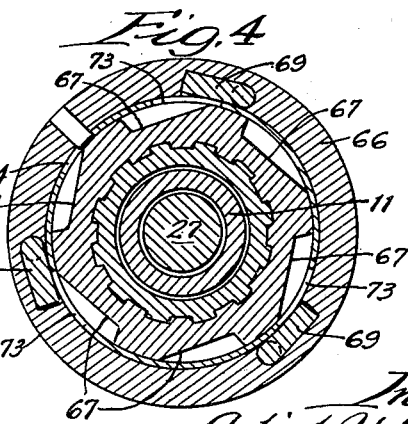
Figure 4 is a view similar to Figure 3 showing the parts in disengaged position.

The ratchet device 65—66 is constructed as more particularly shown in Figures 3 and 4. In this construction the inner ratchet ring 65 is formed with a series of outwardly facing notches 67, and the outer ring 66 is formed on its inner surface with a series of recesses 68 in which pawls 69 are pivoted. The pawls 69 are urged inward into engagement with the notches, as shown in Figure 3, by coil springs 71 which may be connected to the outer ring and to the pawls in the manner described in my Patent No. 2,340,368. Between the inner and outer ratchet rings there is mounted a blocking ring 72 having openings 73 therein to register with the pawls so that they can move inward. The blocking ring engages the inner ratchet ring with a relatively light friction and its rotation relative to the outer ratchet ring 66 is limited by a pin 73 fitting into an elongated slot 74 in the blocking ring.

When the torque converter is operating at relatively high torque multiplication conditions so that the fluid strikes the fronts of both sets of stator vanes and tends to turn them backwards, the ring 57 is held against reverse rotation by the one-way brake 62, and the ring 58 is connected to the ring 57 by the ratchet device 65—66. The notches 67 and the pawls 69 are so located that when they are in engagement the vanes 59 and 61 are in register to provide for a smooth flow of fluid through the stator. At this time the stator functions as a single stator unit in the normal manner.

As the speed increases and the torque ratio decreases, fluid will start to strike the backs of the stator vanes 61 tending to drive them forward. At this time the outer ratchet ring 66 tends to turn clockwise relative to the inner ratchet ring 65, as seen in Figures 3 and 4, so that the pawls 69 will be cammed outward into the recesses and the blocking ring will be turned to the position shown in Figure 4 to hold the pawls out of engagement with the notches 67. At this time the ring 58 is disconnected from the ring 57 and is free to rotate forward. It will be noted that the pawls 69 are urged outward by centrifugal force so that when the ring 58 is rotated above a predetermined speed fixed by the weight of the pawls and the strength of the spring 71 the pawls will remain in their outer positions in the recesses 68 regardless of the position of the blocking ring. Therefore, at relatively high speeds it is impossible for the stator ring 58 to be held against rotation so that the ratchet can never engage under conditions which would produce a shock and possible damage to the parts. Before engagement of the ratchet can occur, it is necessary for the stator ring 58 to slow down substantially in its speed and to tend to move in a reverse direction.

As the speed increases still further and torque multiplication approaches closer to unit, the fluid will strike the backs of the stator vanes 59 causing them to overrun the brake 62. Under these conditions the device functions as a fluid flywheel, and the stator rings are of no effect.

This application is a continuation in part of my copending application Serial No. 38,803 filed July 15, 1948 and now abandoned.

While two embodiments of the invention have been shown and described in detail herein, it will be understood that they are illustrative only and are not to be taken as a definition of the scope of the invention, reference being had for this purpose to the appended claims.

What is claimed is:

1. A hydraulic torque transmitting device comprising vaned driving and driven members, the driving member including a main vaned ring and an auxiliary vaned ring at the discharge end of the main ring, a pair of coaxial ratchet members the inner of which is connected to the main ring and the outer of which is connected to the auxiliary ring, the outer ratchet member being formed on its inner surface with a series of notches, pawls pivoted on the inner ratchet member and engageable with the notches to hold the rings against relative rotation in one direction, a blocking ring between the ratchet members formed with openings through which the pawls can project, and a lost motion connection between the blocking ring and the inner ratchet member.

2. A hydraulic torque transmitting device comprising vaned driving and driven members, the driving member including a main vaned ring and an auxiliary vaned ring at the discharge end of the main ring, a pair of coaxial ratchet members the inner of which is connected to the main ring and the outer of which is connected to the auxiliary ring, the outer ratchet member being formed on its inner surface with a series of notches, pawls pivoted on the inner ratchet member and engageable with the notches to hold the rings against relative rotation in one direction, springs urging the pawls inward, the pawls tending to move outward into engagement with the notches above a predetermined speed of the main ring, a blocking ring between the ratchet members formed with openings through which the pawls may project, and a lost motion connection between the blocking ring and the inner ratchet member.

3. A hydraulic torque transmitting device comprising vaned driving and driven members, the driving member including a main vaned ring and an auxiliary vaned ring at the discharge end of the main ring, a pair of coaxial ratchet members one of which is connected to the main ring and the other of which is connected to the auxiliary ring, said other of the ratchet members being formed with a series of notches, pawls pivoted on said one of the ratchet members and movable into engagement with the notches in response to centrifugal force above a predetermined speed of the main ring, and springs connected to the pawls urging them out of engagement with the notches.

4. A hydraulic torque transmitting device comprising vaned driving and driven members, the driving member including a main vaned ring and an auxiliary vaned ring at the discharge end of the main ring, a pair of coaxial ratchet members one of which is connected to the main ring and the other of which is connected to the auxiliary ring, said other of the ratchet members being formed with a series of notches, pawls pivoted on said one of the ratchet members and movable into engagement with the notches in response to centrifugal force above a predetermined speed of the main ring, a blocking ring between the ratchet members formed with openings through which the pawls can project, the blocking ring frictionally engaging said other of the ratchet members, and a lost motion connection between the blocking ring and said one of the ratchet members limiting relative motion thereof between two extreme positions in both of which the blocking ring blocks movement of the pawls toward the notches, the blocking ring having an intermediate position in which the openings therein register with the pawls.

References Cited in the file of this patent

UNITED STATES PATENTS

| | | |
|---|---|---|
| 928,434 | Fellows | July 20, 1909 |
| 1,993,360 | Föttinger | Sept. 26, 1916 |
| 1,760,480 | Coats | May 27, 1930 |
| 1,965,518 | Wilson | July 3, 1934 |
| 2,037,252 | Martyrer et al. | Apr. 14, 1936 |
| 2,042,189 | Rabe | May 26, 1936 |
| 2,143,121 | Cox | Jan. 10, 1939 |
| 2,271,919 | Jandasek | Feb. 3, 1942 |
| 2,340,368 | Dodge | Feb. 1, 1944 |
| 2,377,826 | Teagno | June 5, 1945 |
| 2,551,000 | Horton | May 1, 1951 |
| 2,606,460 | Kelley | Aug. 12, 1952 |